US008326453B2

(12) United States Patent
Steenge

(10) Patent No.: US 8,326,453 B2
(45) Date of Patent: Dec. 4, 2012

(54) METHOD FOR SORTING MAIL ITEMS OF VARYING FORMAT RANGES AND SORTING MACHINE

(75) Inventor: Tijs Wiebe Steenge, Den Haag (NL)

(73) Assignee: PTT Post Holdings B.V., The Hague (NL)

( * ) Notice: Subject to any disclaimer, the term of this patent is extended or adjusted under 35 U.S.C. 154(b) by 338 days.

(21) Appl. No.: 12/746,623

(22) PCT Filed: Dec. 8, 2008

(86) PCT No.: PCT/NL2008/050782

§ 371 (c)(1), (2), (4) Date: Jun. 7, 2010

(87) PCT Pub. No.: WO2009/072890

PCT Pub. Date: Jun. 11, 2009

(65) Prior Publication Data

US 2010/0256807 A1 Oct. 7, 2010

(30) Foreign Application Priority Data

Dec. 6, 2007 (NL) ..................................... 2001062

(51) Int. Cl.
*G06F 7/08* (2006.01)

(52) U.S. Cl. ........ 700/224; 700/223; 700/225; 700/226; 270/52.02

(58) Field of Classification Search .................. 700/223, 700/224, 225, 226; 270/52.02; 209/584
See application file for complete search history.

(56) References Cited

U.S. PATENT DOCUMENTS

| | | | | |
|---|---|---|---|---|
| 6,610,955 | B2 * | 8/2003 | Lopez | 209/584 |
| 7,138,596 | B2 * | 11/2006 | Pippin et al. | 209/584 |
| 7,220,093 | B2 * | 5/2007 | Overman et al. | 414/796.9 |
| 7,960,668 | B2 * | 6/2011 | Fethke et al. | 209/584 |
| 2005/0279674 | A1 | 12/2005 | Gillet | |

FOREIGN PATENT DOCUMENTS

| | | |
|---|---|---|
| DE | 103 44 576 | 12/2004 |
| EP | 1 500 440 | 1/2005 |
| FR | 2 866 251 | 8/2005 |

OTHER PUBLICATIONS

International Search Report dated Mar. 10, 2009, from corresponding PCT application.

* cited by examiner

*Primary Examiner* — Leslie A Nicholson, III
(74) *Attorney, Agent, or Firm* — Young & Thompson

(57) ABSTRACT

Sorting machine for sorting mail items according to destination codes, each mail item being provided with a destination address, includes: first and second sorting routes for sorting mail items of first and second format ranges, respectively, and an output station. The output station includes first output positions for the first sorting route for receipt of sorted mail items from the first format range, and a same number of second output positions for the second sorting route. Each first output position is arranged each time at one second output position to form a combined output position. Each combined output position is associated each time with one of the number of destination codes. Each destination code is associated with one or more destination addresses. Each combined output position is associated each time with one of the number of destination codes. Each destination code is associated with one or more destination addresses.

19 Claims, 4 Drawing Sheets

METHOD FOR SORTING MAIL ITEMS OF VARYING FORMAT RANGES AND SORTING MACHINE

The present invention relates to a sorting machine for sorting mail items of varying format ranges. The present invention also relates to a method for sorting mail items of varying format ranges.

A postal service applies a distribution process in order to deliver mail items from senders to recipients.

In the prior art, it is known that mail items delivered to a postal service are sorted. A sender creates a mail item for the recipient and offers this for delivery to the postal service. In a first sorting centre (distribution centre) the mail item is then identified by a destination address on the mail item and sorted according to the location of the recipient. The mail item is then transported from the first sorting centre to a second sorting centre which is located logistically and/or geographically in the immediacy of the location of the recipient. The mail item is then taken from the second sorting centre to a delivery centre. In the delivery centre, the mail items are issued to a mail deliverer who delivers the mail items according to a pre-determined delivery route, known in the prior art. It is possible that another transport takes place from the delivery centre to a depot, from where the mail items are then delivered by the mail deliverer. Sorting in sorting centres is generally automated by the use of sorting machines.

The quantities of mail items that require processing are so large that sorting by hand is inefficient.

A problem with mail sorting is that the physical dimension of mail items may vary to a large extent.

This is disadvantageous to the above-described sorting process. A sorting machine for automatically sorting mail items is normally arranged for sorting mail items of a single format. The reason for this is the adaptation of the mechanism of the sorting machine to the physical dimensions of mail items. It is known in the prior art that the sorting machine typically comprises an input station, a sorting route, an address recognition system, selection means and a number of output positions.

Due to mechanical restrictions, a sorting machine is typically only capable of sorting mail items of a certain format. Mail items which have a different format must therefore be sorted separately, for example, by another sorting machine which is set up for sorting mail items in that other format or, for example, be sorted manually in the case of mail items with a dimension only applied in relatively small numbers.

As a result, additional logistic steps are required in the distribution process of mail items. The mail items in the different formats are processed (sorted and transported) separately up to the level of the delivery centre or delivery route according to their format. In the delivery centre, final sorting takes place where the mail items of the different formats are individually placed in sequence according to the delivery route and subsequently bundled to form a mail bundle (for each delivery route). The mail deliverer subsequently delivers the mail items from the mail bundle along the delivery route according to the destination addresses.

A disadvantage is that, with the aforesaid method of mail distribution, a mail item must be inefficiently transported and sorted inefficiently several times.

An object of the present invention is to provide a method to reduce or eliminate this disadvantage.

To this end, the present invention provides a method for sorting mail items according to a number of destination codes, by providing each mail item being provided with a destination address, comprising:

an initial sorting of mail items of a first format range, receiving sorted mail items of the first format range in a number of first output positions, a second sorting of mail items of a second format range, receiving sorted mail items of the second format range in a number of second output positions, wherein each of the first output positions and each of the second output positions form a combined output position, wherein each combined output position is associated each time with one of the number of destination codes, and each destination code is associated with one or more destination addresses.

In practice, mail items are offered in a number of several formats (for example C5, C4, LL, letter bundles). A certain relation appears to exist between the numbers of the different formats in which mail items are offered.

The present invention aims, on the one hand, at increasing the format range within which mail items can be processed by the sorting machine. By arranging the sorting machine for sorting mail items according to a certain format range, the sorting machine is advantageously able to process mail items of several formats within the format range without mechanical problems arising. This enables the capacity of the sorting machine to be exploited much more efficiently.

It appears that, on the basis of numbers found in practice, the first and second format ranges can be selected in such a manner that essentially all mail items are within these two ranges.

The present invention also provides a sorting machine for sorting mail items according to a number of destination codes, each mail item being provided with a destination address;

the sorting machine, comprising: a first sorting route for sorting mail items of a first format range, a second sorting route for sorting mail items of a second format range, and an output station, wherein the output station comprises a number of first output positions for the first sorting route for receiving sorted mail items from the first format range, and a same number of second output positions for the second sorting route for receiving sorted mail items of the second format range, wherein each of the first output positions is arranged each time at (or adjacent to or above) one of the second output positions to form a combined output position of the output station, wherein each combined output position is associated each time with one of the number of destination codes, and each destination code is associated with one or more destination addresses.

Further embodiments according to the present invention are described in the subsequent claims.

The invention will be described in more detail below by means of several drawings in which exemplary embodiments are shown. The drawings are intended exclusively to illustrate the aims of the invention and not to restrict the scope of the invention, which is defined by the attached conclusions, wherein.

In practice mail items are offered in a number of several formats (for example C5, C4 and LL, letter bundles).

The output positions are each individually associated with a certain destination code, such as an address or a delivery area.

At the import station, the sorting machine receives mail items of the format to process. From the import station, where an address recognition system is arranged, the mail items are guided along a sorting route. The output positions are arranged along the sorting route.

Figure 1:
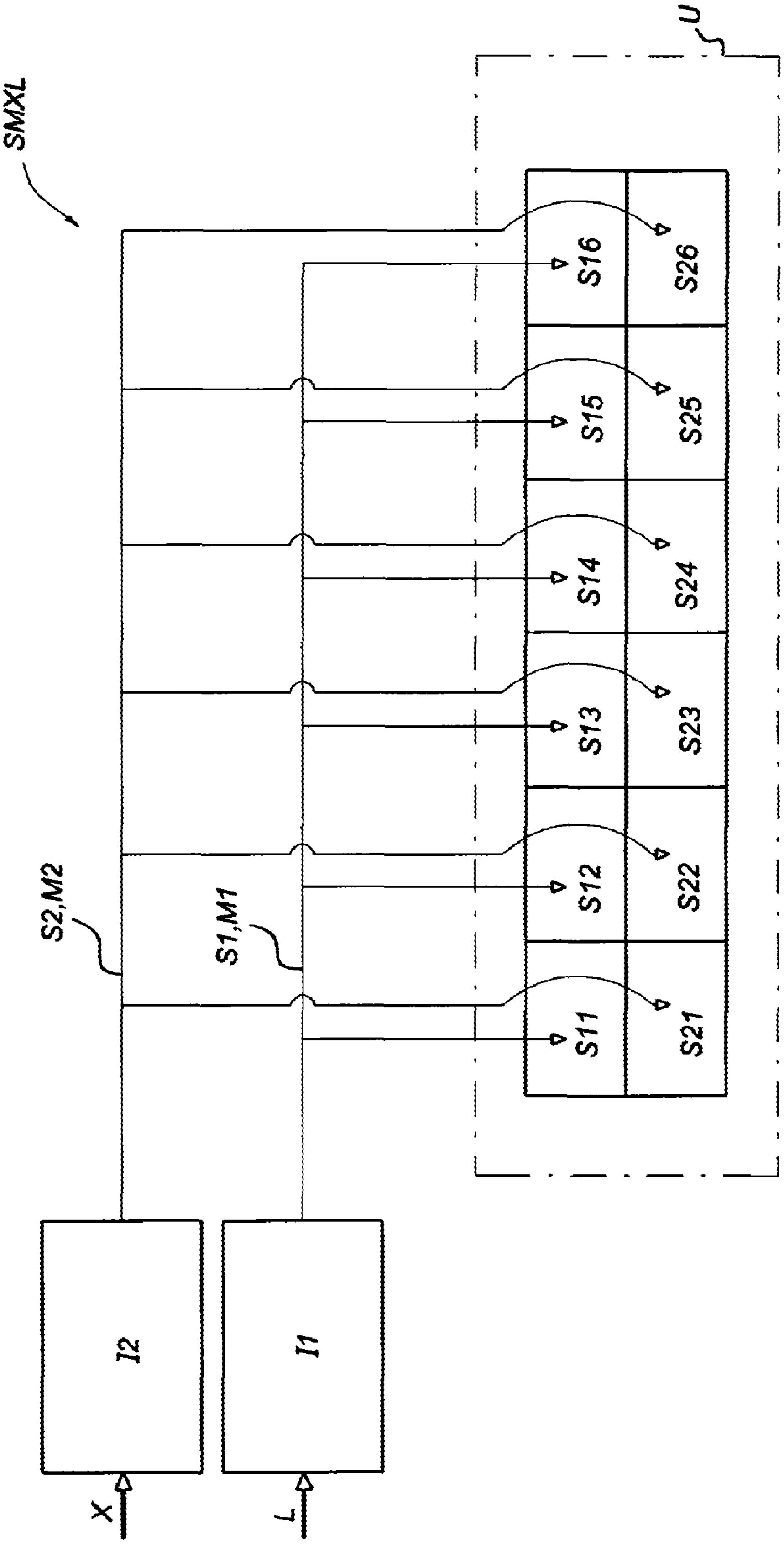
FIG. 1 shows a flow diagram for a method according to the present invention.

FIG. 1 shows schematically a sorting machine SMXL in an embodiment according to the present invention.

The sorting machine SMXL comprises a first import station I1 for receiving mail items of a first format range L, a second import station I2 for receiving mail items of a second format range X, a first sorting route S1 for mail items of the first format range L, a second sorting route S2 for mail items of the second format range X, and an output station U.

The first import station I1 is linked to the first sorting route S1 that is linked to an output station U.

The second import station I2 is linked to the second sorting route S2, that it is also linked to the output station U.

Additionally, the sorting machine comprises a first address recognition system A1 and a second address recognition system A2.

The first address recognition system A1 is arranged for recognition of a destination address of a mail item which is sorted according to the first sorting route S1.

The second address recognition system A2 is arranged for recognition of a destination address of a mail item which is sorted according to the second sorting route S2.

For example, the first and/or second address recognition system for an appropriate mail item determines a destination address based upon an image of the address on the mail item.

Within each sorting route S1, S2, the sorting machine comprises each time a selector M1, M2 which is arranged to derive a destination address based upon the address detected by the respective recognition system S1, S2 to derive a destination code and to place the mail item associated with that destination address from the respective sorting route in an output position linked to the destination code in the output station U.

The output station U comprises first output positions S11, S12, S13, S14, S15, S16 for mail items of the first format range L and second output positions S21, S22, S23, S24, S25, S26 for mail items of the second format range X, wherein the number of first positions for the first sorting route is arranged for receiving sorted mail items of the first format range, and the number of second output positions for the second sorting route is arranged for receiving sorted mail items of the second format range.

Here, in the output station U, each of the first output positions S11 . . . S16 is arranged at (adjacent to or above) one of the second output positions 521 . . . S26 to form a combined output position, wherein each combined output position is associated each time with one of a number of destination codes. Each combined output position therefore comprises a first output position linked to an associated second output position.

This enables mail items of different format ranges, but with the same destination codes, to be in the sorting machine at adjacent locations. This has the advantage that the logistics are simplified when collecting and sorting mail items of varying format ranges but with the same destination code.

An advantageous result is also achieved by dividing mail items into two format ranges, and by sorting these mail items according to combined output positions, that the mail items of one format range can be easily sorted with the mail items of the other format range and combined at the output position, to enable the further processing of the mail items to the delivery centres to be simplified. No further sorting is required at the delivery centres.

In this way each destination code is associated with one or more destination addresses in the delivery area.

The number of second output positions S21, S22, S23, S24, S25, S26 is equal to the number of first output positions S11, S12, S13, S14, S15, S16.

Each of the first output positions S11, S12, S13, S14, S15, S16 is linked each time to one of the second output positions S21, S22, S23, S24, S25, S26 for the same destination name within the delivery area.

During the first sorting route S1, when in use, mail items of the first format range L are guided along the first address recognition system A1, which determines the destination address of each mail item and a destination code associated with that destination address.

The sorting machine is automated. The address recognition system and the selector comprise a processing unit or are connected to one.

The processing unit is arranged in order to acquire sorting data from a databank to enable the execution of the sorting process. The function of the sorting data is to link each of the combined output positions to a possible destination code (within a preset range of destination codes).

In one embodiment, the sorting machine SMXL comprises a first mail item transport system as a first sorting route and a second mail item transport system as a second sorting route.

Figure 2:
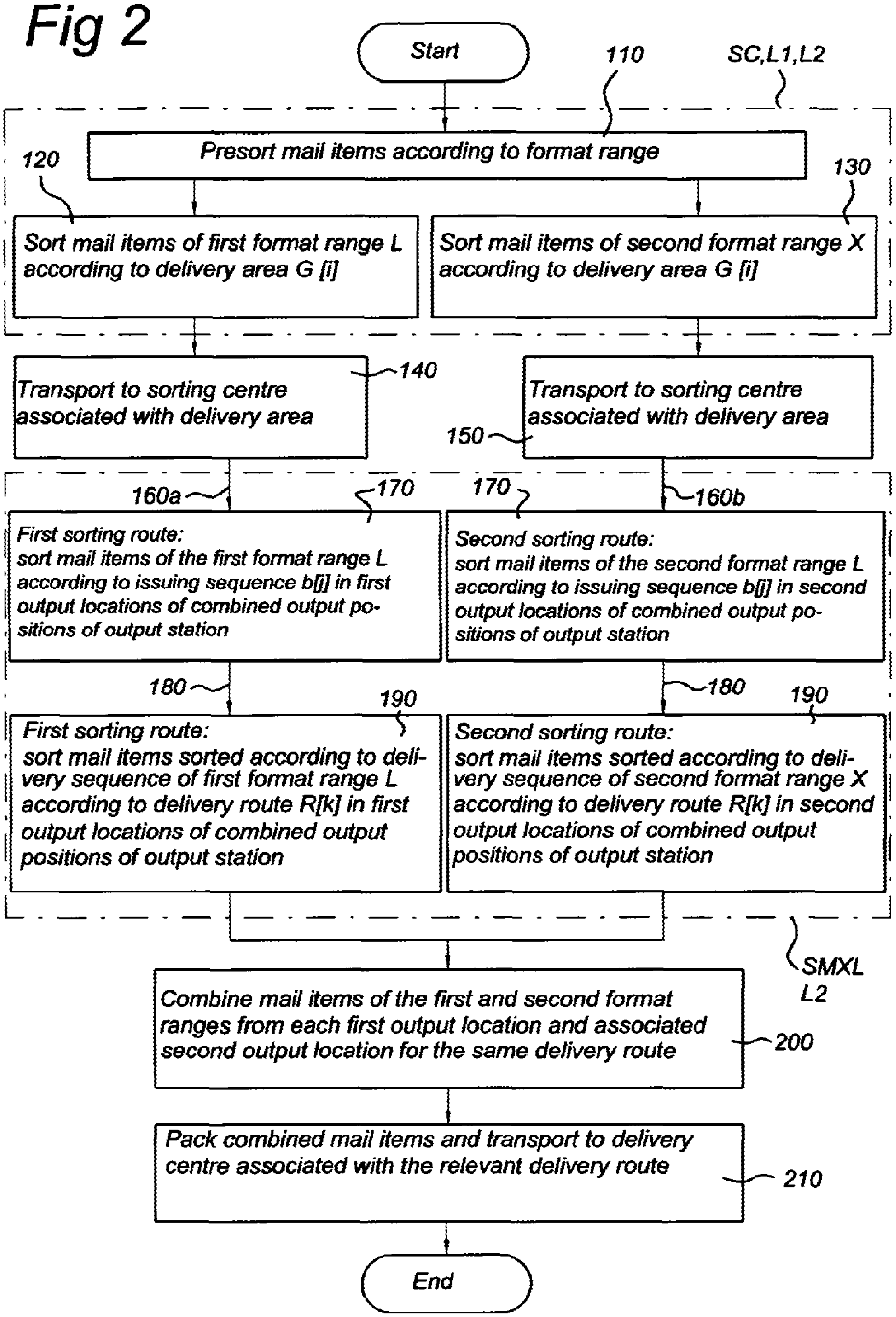
FIG. 2 shows a sorting machine in an embodiment according to the present invention.

FIG. 2 shows a flow diagram for a process the present invention comprises for sorting mail items of various format ranges.

The method is shown in procedure 100.

In an action 110, presorting of mail items in two format ranges takes place, schematically indicated by a first format range L and a second format range X. Mail items which fall beyond these format ranges are separated from the mail flow and processed separately.

In a subsequent action 120, a sorting process takes place for the mail items of the first format range L to delivery areas, schematically indicated by G[i].

An action 130 also takes place to execute a sorting process for the mail items of the second format range X to delivery areas, schematically indicated by G[i], where i is an index for the delivery areas.

The actions from 110 to 130, for example, take place in the first sorting centre SC, where the mail items are processed.

In a subsequent action 140, depending on their delivery area G [i], the mail items of the first format range L are transported to a sorting centre associated with the delivery area G[i], which comprises a sorting machine SMXL according to the present invention.

Each time in an action 150, the mail items of the second format range L are transported to a sorting centre associated with the delivery area G [i], depending upon their delivery area G[i], which comprises a sorting machine SMXL according to the present invention.

In an action 160*a*, the mail items of the first format range for the associated delivery area, schematically designated by L(G[i]), are introduced in the first input station I1 of the sorting machine SMXL.

At the same time, in an action 160*b*, the mail items of the second format range for the associated delivery area X(G[i]) are introduced in the second input station I2 of the sorting machine SMXL.

In an action 170 during a first passage, the mail items of the first format range L(G[i]) are subsequently sorted simultaneously along the first sorting route S1, and the mail items of the second format range X(G[i]) along the second sorting route S2 according to the sequence number of the issuing point, schematically indicated by b[j].

An issuing point can be understood to be a location where the mail is to be delivered.

In this first passage, sorting takes place according to each group of issuing points with the same issuing sequence number. (For example, the first issuing point of 10 mail deliverers in a first combined output position. The second group in the second combined output position then comprises the second issuing points of those 10 mail deliverers, etc.).

In the first passage, the first and second output positions of the output station U are logically linked according to destination code (for example via sorting data from the aforesaid databank) to the sequence number of the issuing point of the mail items of the first format range L and the second format range X, respectively.

The mail items of the first format range L are sorted according to the sequence number of issuing point b[j] in the first output positions S11, S12, S13, S14, S15, S16 of the output station U as first sorted mail items L(G [i], b[j]). Here, j designates a position index for the first and second output positions in the output station U. The mail items of the second format range X are sorted according to the sequence number of issuing point b[j] in the second output positions S21, S22, S23, S24, S25, S26 of the output station U as second sorted mail items X(G[i], b[j]). In the output station U, each first output position is arranged each time adjacent to one of the second output positions so that each first output position comprises mail items of the first format range L for a given sequence number of the issuing point b[j] and the second output position arranged adjacent to the associated first output position comprises mail items of the second format range X for the same sequence number of issuing point b[j].

In an action 180, the mail items of the first format range L(G[i], b[j]) are subsequently introduced again into the first input station I1 of the sorting machine SMXL according to the sequence number of the issuing point b[j]. The mail items of the second format range X(G[i], b[j]) are also introduced again into the second input station I2 of the sorting machine SMXL according to the sequence number of the issuing point b[j].

In an action 190 of a second passage, the mail items of the first format range L(G [i], b[j]) are subsequently sorted simultaneously along the first sorting route S1 and the mail items of the second format range X(G[i], b[j]) along the second sorting route S2 according to the delivery route within the delivery with the sequence number of the issuing points b[j], the delivery route sorting being schematically indicated by R[k]. Here, k is a position index for the first and second input positions in the output station U.

In the second passage, the first and second output positions of the output station U are logically linked according to destination code to the delivery route of each deliverer within the delivery with the sequence number of the issuing points b[j] of the mail items of the first format range L and the second format range X, respectively. The mail items of the first format range L(G[i], b[j]) are sorted as first sorted mail items L(G[i], b[j],R[k]) according to delivery route R[k] in the first output positions S11, S12, S13, S14, S15, S16 of the output station U.

The mail items of the second format range X(G[i], b[j]) are sorted as second sorted mail items X(G[i], b[j], R[k]) according to the delivery route R[k] in the second output positions S21, S22, S23, S24, S25, S26 of the output station U.

Each first output position is arranged each time adjacent to one of the second output positions so that each first output position comprises mail items of the first format range L for a given delivery area G [i], sequence number of the issuing point b [j] and delivery route R[k], and the second output position arranged adjacent to the associated first output position, comprises mail items of the second format range X for the same parameters of the delivery area G[i], the sequence of issuing point b[j] and delivery route R[k].

In subsequent action 200 in the output station U, for each first output position and the associated second output position, the sorted mail items of the first format range L and the mail items of the second format range X are laid in sequence of delivery and combined to form a combined bundle BN.

In action 210 the combined bundles are then packed and made suitable for transport to the delivery centre.

The number of first and second output positions in use as sorting positions j during the first passage may differ from the number used as sorting positions k during the second passage.

However, in order to achieve the best possible distinction in the sorting process, preference is given to the use of all sorting positions during each passage.

The method is advantageous in that final sorting is no longer required at the delivery centre.

In action 120, the sorting process which takes place for the mail items of the first format range L to delivery areas and the sorting process that takes place in action 130 for the mail items of the second format range X to delivery areas can take place using sorting machines known in the prior art for only one format range, but may also take place with the use of the sorting machine according to the invention, as described with reference to FIG. 1. In the event that the sorting machine according to the invention is used in actions 120 and 130, i is a position index for the first and second output positions in the output station U.

Furthermore, it may be noted that during the first passage (action 160*a*), mail items of the first format range L which are presorted according to delivery area, in the form of batched mail items (so-called E-sorted mail) originating from a provider, may be included in the mail items of the first format range for the associated delivery area L(G[i]). In the same manner, during the first passage (action 160*b*) E-sorted mail of the second format range X may be included in the mail items of the second format range for the associated delivery area X(G[i]).

Figure 3:
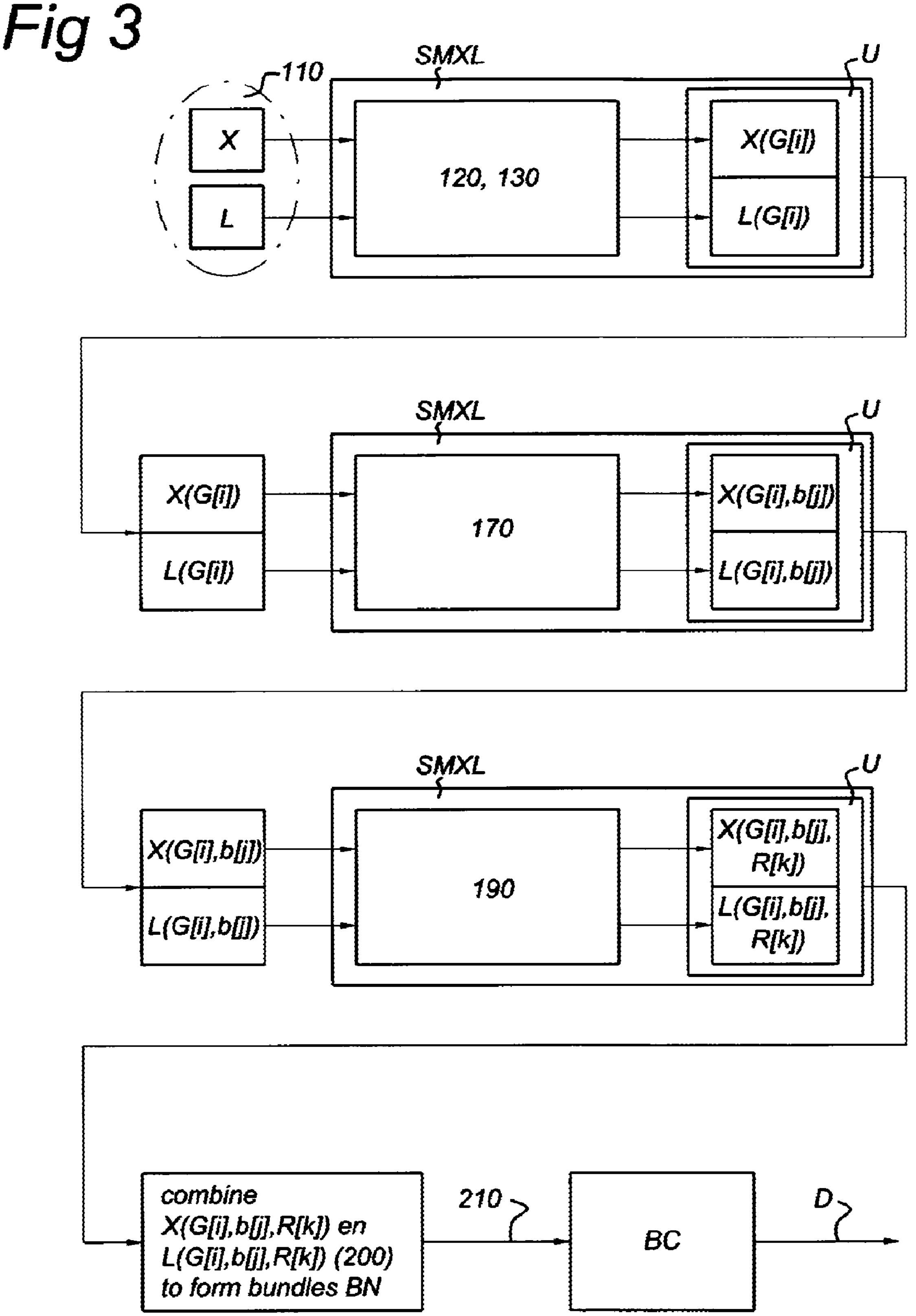
FIG. 3 shows a logistical diagram of the course of the method according to FIG. 2, in conjunction with the sorting machine according to FIG. 1.

FIG. 3 shows a logistical diagram of the course of an embodiment of the method according to FIG. 2 in conjunction with the sorting machine according to FIG. 1.

In FIG. 3, the same reference numerals refer to corresponding components as used in the preceding figures.

Mail items which have been presorted (110) according to the first and second format range X, L, are included in the sorting machine SMXL at a location L1 at the first and second input I1, I2 respectively.

The location L1, for example, is the first sorting centre where the mail items are received from the sender.

The sorting machine SMXL at location L1 executes actions 120 and 130 to sort the mail items of the first format range L and the second format range X respectively, according to delivery area G[i]. The mail items of the first and second format range L(G[i]), X(G[i]) sorted according to delivery area are stored in the output station U according to the first and second output position (sorting position), for example in a container placed at the output position.

In an alternative manner, actions 120 and 130 can be carried out on different sorting machines which sort according to delivery area for the first and second format range L, X respectively.

Subsequently, mail items of the first and second format range L(G[i]), X(G[i]) sorted according to delivery area, are transported to a sorting centre which is associated with the corresponding delivery area G[i]. This sorting centre, associated with the delivery area, is arranged at a location L2; the sorting centre may possibly be the same L1, where the sorting according to delivery area takes place.

The mail items of the first and second format range L (G[i]), X(G[i]) sorted according to delivery area are introduced in the sorting machine SMXL in the sorting centre L2; L1, associated with the delivery area.

The sorting machine SMXL carries out action 170 to sort the mail items of the first format range and second format range L(G[i]), X(G[i]) according to the sequence number of the issuing point b[j].

The mail items of the first and second format range L (G[i], b[j]), X(G[i], b[j]) sorted according to the sequence number of the issuing point are stored in the output station U according to each first and second output position (sorting position) respectively.

The mail items of the first and second format range L(G[i], b[j]), X(G[i], b[j]) sorted according to the sequence number of the issuing point are then simultaneously sorted during the second passage (action 190) according to a delivery route within the delivery area with the sequence number of the issuing point b[j], whereby the delivery route sorting is indicated schematically by R[k].

The mail items of the first and second format range L(G[i], b[j], R[k]), X(G[i], b[j], R[k]) sorted according to delivery route are combined (action 200) for each first and associated second output position (sorting position) to form combined bundles BN.

Each combined bundle BN is packed and transported to the delivery centre BC (action 210) according to the delivery route of the bundle associated with the delivery centre BC (action 210).

From the delivery centre BC, delivery D of the mail items takes place, the mail items, having been sorted in each combined bundle BN according to delivery route (or part thereof, depending on the extent of the delivery route).

Figure 4:
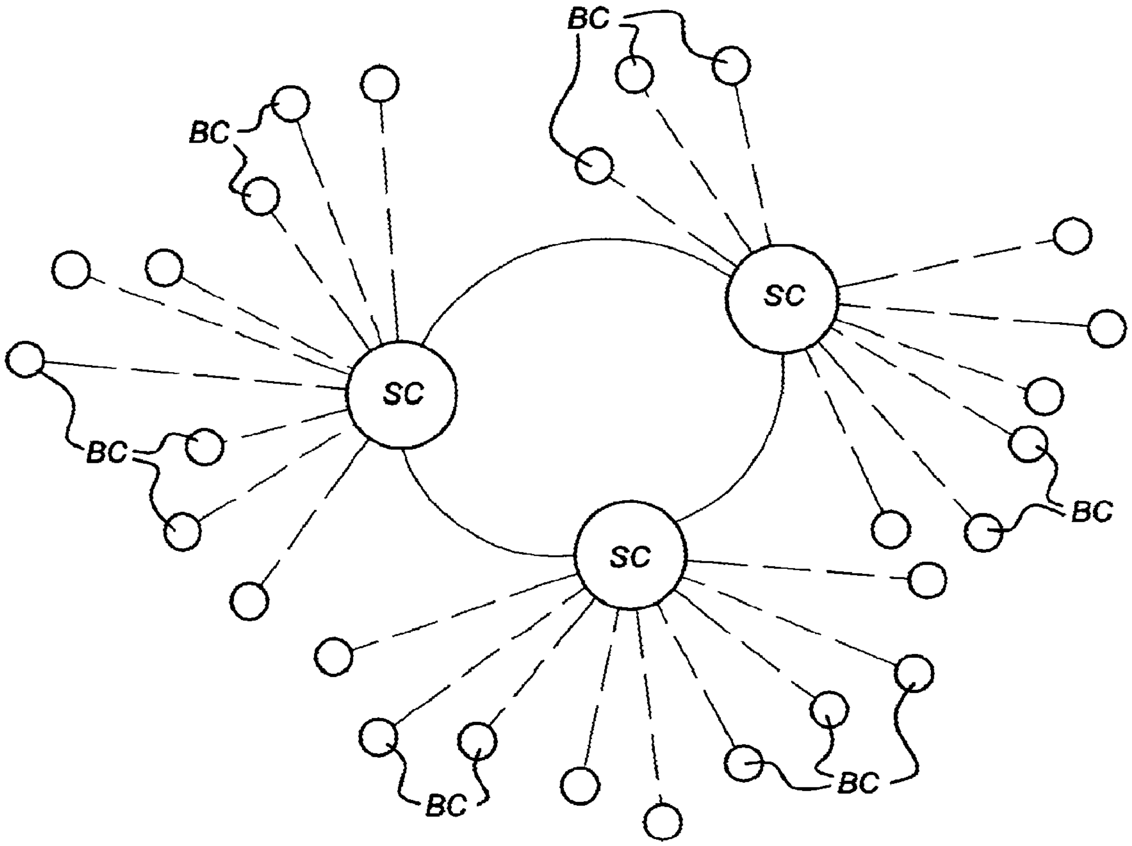
FIG. 4 is a diagram for a distribution system in conjunction with the diagram of FIG. 3.

FIG. 4 shows a diagram for a distribution centre in conjunction with the diagram of FIG. 3.

The sorting machine SMXL and the method according to the invention allow to form a distribution system within a distribution area with a relatively simple structure. The distribution system for use with the sorting machine and the method according to the invention comprises a number of sorting centres SC and a number of delivery centres BC. The sorting centres are in mutual contact by the transport of mail items (indicated in FIG. 4 by fixed lines). This mutual transport is related to the preparation of the sorting process after presorting according to format range L, X and delivery area G[i] (actions 110-130).

Each sorting centre SC is in contact with a part of the number of delivery centres BC (in FIG. 4 the transport is indicated by dotted lines), for which the respective sorting centre SC carries out the sorting process for the issuing points and the one or more delivery routes of that part of the number of delivery centres. The described transport between sorting centres and the delivery centres is related to the distribution of the mail sorted in the bundles BN.

Alternative and equivalent embodiments of the present invention are conceivable within the scope of the invention, as will be apparent to those skilled in the art. The concept of the invention being restricted only by the accompanying claims.

The invention claimed is:

1. Sorting machine (SMXL) for sorting mail items according to a number of destination codes, each mail item being provided with a destination address;

the sorting machine comprising: a first sorting route (S1, A1) for sorting mail items of a first format range (L), a second sorting route (S2, A2) for sorting mail items of a second format range (X), and an output station (U), wherein the output station comprises a number of first output positions (S11 . . . S16) for the first sorting route for receiving sorted mail items of the first format range, and a same number of second output positions (S21 . . . S26) for the second sorting route for receiving sorted mail items of the second format range, wherein each of the first output positions (S11 . . . S16) is arranged each time adjacent to one of the second output positions (S21 . . . S26) to form a combined output position of the output station (U), each combined output position of the output station therefore comprising a first output position linked to an associated second output position, wherein each combined output position is associated each time with one of the number of destination codes, and each destination code is associated with one or more destination addresses.

2. Sorting machine according to claim 1, wherein the sorting machine for each sorting route (S1; S2) further comprises an address recognition system (A1; A2) for recognizing the destination address.

3. Sorting machine according to claim 2, wherein the sorting machine comprises a selector (M1, M2) in the first, respectively, second sorting route (S1; S2), the selector being arranged to derive the destination code based on a destination address recognized by the respective address recognition system (A1; A2) and to place the mail item (L; X) associated with the destination code from the respective sorting route in the output station (U) according to a first and second output position (S11 . . . S16; S21. S26) associated with the destination code.

4. Sorting machine according to claim 3, wherein the destination code is chosen from the group of delivery area (G[i]), sequence number of the issuing point (b[j]) and delivery route (R[k]).

5. Sorting machine according to claim 3, wherein the output station (U) is arranged for each first output position (S11 . . . S16) and the associated second output position (S21 . . . S26), to lay the sorted mail items of the first format range (L) and the sorted mail items of the second format range (X) in delivery sequence and to combine said mail items to form a combined mail bundle (BN).

6. Sorting centre, arranged for executing a method according to claim 3.

7. Sorting machine according to claim 2, wherein the destination code is chosen from the group of delivery area (G[i]), sequence number of the issuing point (b[j]) and delivery route (R[k]).

8. Sorting machine according to claim 2, wherein the output station (U) is arranged for each first output position (S11 . . . S16) and the associated second output position (S21 . . . S26), to lay the sorted mail items of the first format range (L) and the sorted mail items of the second format range (X) in delivery sequence and to combine said mail items to form a combined mail bundle (BN).

9. Sorting centre provided with a sorting machine according to claim 2.

10. Sorting machine according to claim 1, wherein the destination code is chosen from the group of delivery area (G[i]), sequence number of the issuing point (b[j]) and delivery route (R[k]).

11. Sorting machine according to claim 10, wherein the output station (U) is arranged for each first output position (S11 . . . S16) and the associated second output position (S21 . . . S26), to lay the sorted mail items of the first format range (L) and the sorted mail items of the second format range (X) in delivery sequence and to combine said mail items to form a combined mail bundle (BN).

12. Sorting machine according to claim 1, wherein the output station (U) is arranged for each first output position (S11 . . . S16) and the associated second output position (S21 . . . S26), to lay the sorted mail items of the first format range (L) and the sorted mail items of the second format range (X) in delivery sequence and to combine said mail items to form a combined mail bundle (BN).

13. Sorting machine according to claim 12, wherein the destination code is chosen from the group of delivery area (G[i]), sequence number of the issuing point (b[j]) and delivery route (R[k]).

14. Sorting centre provided with a sorting machine according to claim 1.

15. Sorting centre, arranged for executing a method according to claim 1.

16. Method for sorting mail items according to a number of destination codes, each mail item being provided with a destination address, comprising:

sorting mail items of a first format range (L) in a first sorting route, receiving sorted mail items of the first format range in a number of first output positions (S11 . . . S16) of an output station (U), a second sorting of mail items of a second format range (X) in a second sorting route, the receipt of sorted mail items of the second format range in a number of second output positions (S21 . . . S26) of the output station (U), wherein each of the first output positions (S11 . . . S16) and one of the second output positions (S21 . . . S26) each time form a combined output position of the output station (U), each of the first output positions (S11 . . . S16) being arranged each time adjacent to one of the second output positions (S21 . . . S26) to form a combined output position of the output station (U), each combined output position of the output station therefore comprising a first output position linked to an associated second output position, wherein each combined output position is associated each time with one of the number of destination codes, and each destination code is associated with one or more destination addresses, wherein, during a first passage of mail items of the first and second format ranges (L; X), the mail items (L(G[i]); X(G[i])) being presorted according to delivery area, the destination code comprises a sequence number of the issuing point (b[j]) for acquiring mail items (L(G[i], b[j]); X(G[i], b[j])) of the first and second format ranges (L; X), sorted according to delivery area and sequence number of issuing point, and wherein, during a second passage of mail items of the first and second format ranges (L; X), the mail items (L(G[i], b[j]); X(G[i], b[j])) being presorted according to the sequence number of the issuing point, the destination code comprises a delivery route (R[k]) for acquiring mail items (L(G[i], b[j], R[k]); X(G[i], b[j], R[k])) of the first and second format ranges (L; X), sorted according to delivery area, issuing point and delivery route.

17. Method according to claim 16, further comprising for each combined output position of a first output position and an associated second output position, laying the mail items (L(G[i], b[j], R[k]; of X(G[i], b[j], R[k]) in delivery sequence, the mail items having been sorted according to delivery area, sequence number of issuing point and delivery route of the first format range L and of the second format range X, and combining them to form a combined bundle (BN).

18. Sorting centre, arranged for executing a method according to claim 17.

19. Method according to claim 16, wherein, during a passage of mail items of the first and second format ranges (L;X), preceding the first passage, the destination code comprises a delivery area (G[i]) for acquiring mail items (L(G[i]); X(G[i])) of the first and second format ranges (L; X), sorted according to delivery area of the first and second format range (L;X).

* * * * *